(12) United States Patent
Ganard

(10) Patent No.: US 6,595,197 B1
(45) Date of Patent: Jul. 22, 2003

(54) BARBECUE GRILL AND SMOKER WITH BOTTOM MOUNTED FIREBOX

(75) Inventor: John Ganard, New Braunfels, TX (US)

(73) Assignee: W. C. Bradley Company, Columbus, GA (US)

( * ) Notice: Subject to any disclaimer, the term of this patent is extended or adjusted under 35 U.S.C. 154(b) by 0 days.

(21) Appl. No.: 09/636,537

(22) Filed: Aug. 10, 2000

Related U.S. Application Data
(60) Provisional application No. 60/148,435, filed on Aug. 11, 1999.

(51) Int. Cl.[7] ................................................. A47J 37/00
(52) U.S. Cl. .................. 126/25 R; 126/19 R; 126/1 D; 99/476; 99/482
(58) Field of Search .............................. 126/25 R, 41 R, 126/39 R, 19 R, 1 D; 99/467, 339, 340, 447, 479, 473, 482, 481, 400

(56) References Cited

U.S. PATENT DOCUMENTS

| | | | | |
|---|---|---|---|---|
| 580,753 A | * | 4/1897 | Barnard | 99/389 |
| 652,531 A | * | 6/1900 | Carlson | 99/482 |
| 739,214 A | * | 9/1903 | Phillips | |
| 754,557 A | * | 3/1904 | Greene | 126/25 R |
| 821,487 A | * | 5/1906 | Hammack | 126/1 B |
| 834,229 A | * | 10/1906 | Blanchard | 126/39 C |
| 848,018 A | * | 3/1907 | Engelhard | 99/421 H |
| 904,382 A | * | 11/1908 | Van Patten | 99/391 |
| 1,150,172 A | * | 8/1915 | Chadwick | 126/39 C |
| 1,534,867 A | * | 4/1925 | Pschke et al. | |
| 1,964,372 A | * | 6/1934 | Tygart | |
| 2,811,099 A | * | 10/1957 | McGoldrick | 99/444 |
| 2,846,937 A | * | 8/1958 | Jones | |
| 2,867,165 A | * | 1/1959 | Money | |
| 2,894,448 A | * | 7/1959 | Henderson et al. | |

(List continued on next page.)

FOREIGN PATENT DOCUMENTS

EP          0 290 381          * 9/1988

OTHER PUBLICATIONS

Assembly Instructions for El Dorado Outdoor Smoker/Grill Model 5600 (No Date).

*Primary Examiner*—Carl D. Price
(74) *Attorney, Agent, or Firm*—James W. Kayden; Thomas, Kayden, Horstemeyer & Risley, LLP

(57) ABSTRACT

A preferred embodiment of the present invention incorporates a cooking chamber, including a lower portion and a lid that cooperate to define a cooking enclosure. Preferably, the lid is moveably mounted to the lower portion, and the lower portion has a lower surface, which is arranged at least partially beneath the cooking enclosure. Additionally, the lower surface preferably includes an opening formed therethrough that cooperates with a firebox so that an interior of the firebox engages in fluid communication with the cooking enclosure via the opening.

8 Claims, 1 Drawing Sheet

U.S. PATENT DOCUMENTS

| | | | |
|---|---|---|---|
| 3,455,233 A | * 7/1969 | Cable | |
| 3,477,360 A | * 11/1969 | Raney | |
| 3,561,348 A | * 2/1971 | Weir, Sr. | 99/357 |
| 3,568,590 A | * 3/1971 | Grice | 99/446 |
| 3,589,269 A | * 6/1971 | Weir, Sr. | 99/332 |
| 3,696,803 A | * 10/1972 | Holloway, Jr. | 126/276 |
| 4,094,295 A | 6/1978 | Boswell et al. | 126/25 R |
| 4,309,938 A | * 1/1982 | Harmon | |
| D267,769 S | 2/1983 | Pope | D7/2 |
| 4,374,489 A | * 2/1983 | Robbins | 99/482 |
| 4,495,860 A | 1/1985 | Hitch et al. | 99/340 |
| 4,512,249 A | 4/1985 | Mentzel | 99/352 |
| 4,554,864 A | 11/1985 | Smith et al. | 99/340 |
| D284,256 S | * 6/1986 | Moncrief | |
| 4,664,026 A | 5/1987 | Milloy | 99/352 |
| 4,700,618 A | * 10/1987 | Cox, Jr. | |
| 4,721,037 A | 1/1988 | Blosnich | 99/482 |
| 4,757,756 A | 7/1988 | Van Marr | 99/482 |
| 4,773,319 A | * 9/1988 | Holland | 99/446 |
| 4,823,684 A | * 4/1989 | Traeger et al. | |
| 4,882,985 A | * 11/1989 | Beller | |
| 4,934,260 A | 6/1990 | Blevins | 99/482 |
| 4,962,696 A | 10/1990 | Gillis | 99/340 |
| 4,962,697 A | 10/1990 | Farrar | 99/340 |
| 5,070,776 A | 12/1991 | Schlosser et al. | 99/450 |
| 5,129,385 A | * 7/1992 | Dodgen | |
| 5,144,939 A | * 9/1992 | Christopherson | 126/25 R |
| D329,960 S | 10/1992 | Reynolds | D7/334 |
| 5,158,066 A | * 10/1992 | Dodgen | |
| 5,167,183 A | 12/1992 | Schlosser et al. | 99/482 |
| 5,176,124 A | * 1/1993 | Wrasse | |
| 5,191,831 A | 3/1993 | Walden | 99/446 |
| 5,195,423 A | * 3/1993 | Beller | |
| 5,197,379 A | * 3/1993 | Leonard, Jr. | |
| 5,222,475 A | 6/1993 | Greener | 126/41 R |
| 5,359,923 A | 11/1994 | Boswell | 99/340 |
| 5,467,692 A | 11/1995 | Perez, III | 99/340 |
| 5,531,154 A | * 7/1996 | Perez, III | 126/9 R |
| D374,371 S | 10/1996 | Hall McDonald | D7/332 |
| 5,673,613 A | * 10/1997 | Price | |
| 5,865,099 A | 2/1999 | Waugh | 99/340 |
| 5,891,498 A | 4/1999 | Boehler | 426/314 |
| 6,012,381 A | * 1/2000 | Hawn | 99/340 |

* cited by examiner

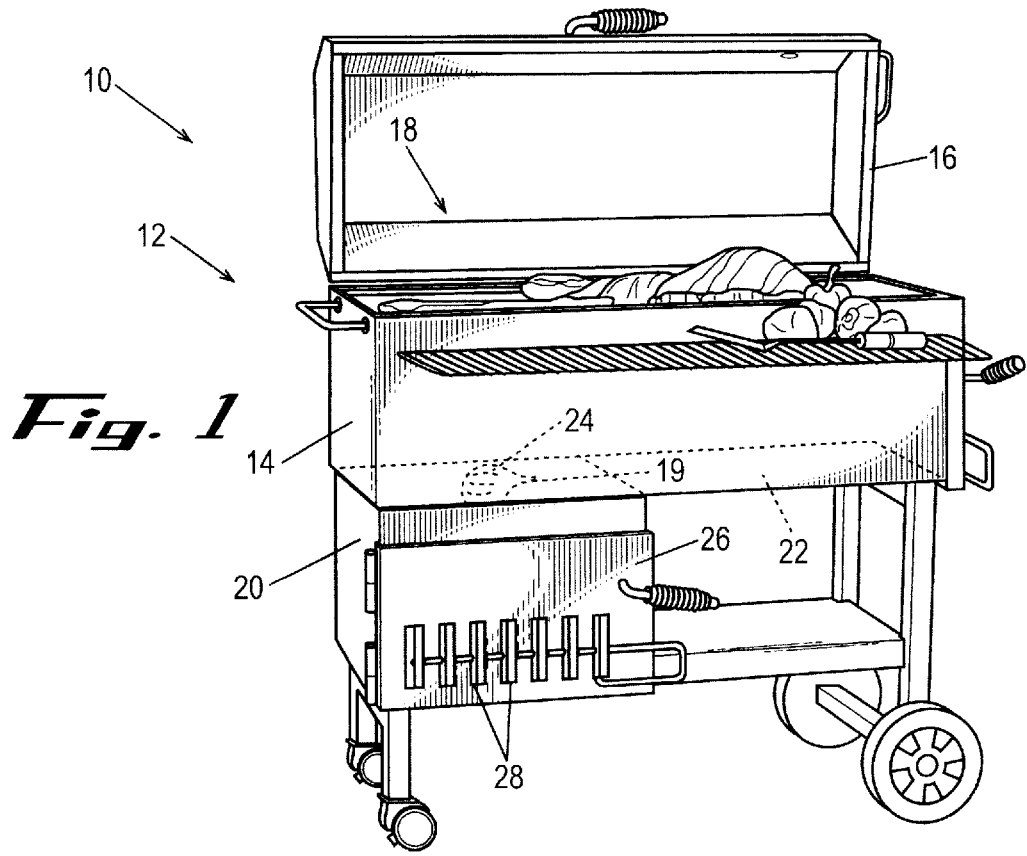
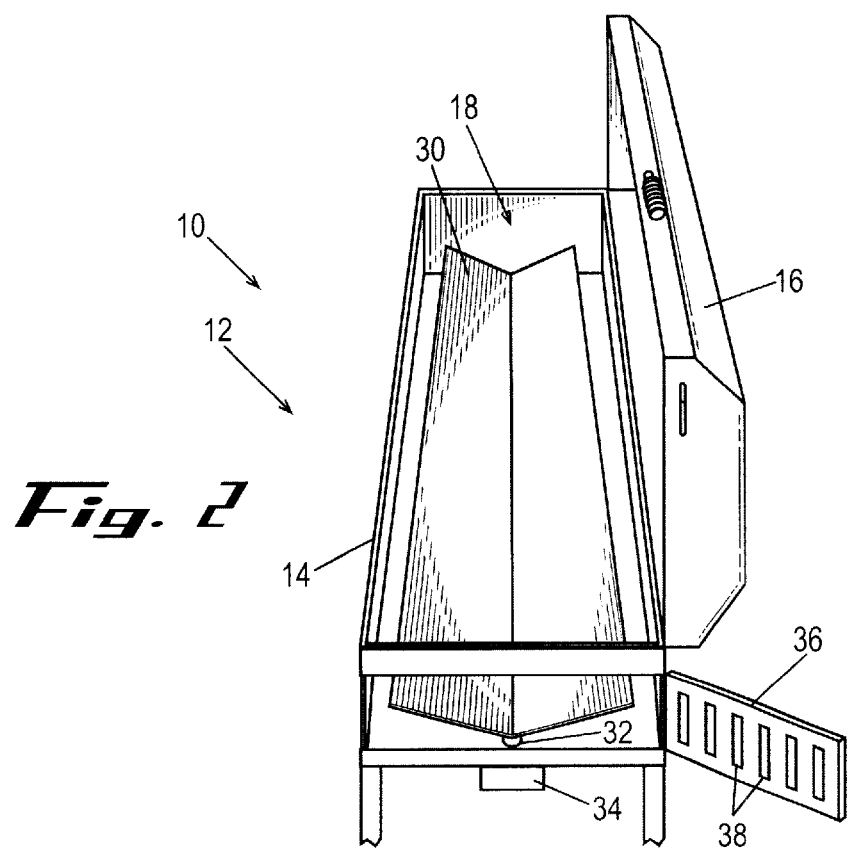

BARBECUE GRILL AND SMOKER WITH BOTTOM MOUNTED FIREBOX

CROSS-REFERENCE TO RELATED APPLICATION

This application claims priority to copending U.S. provisional application entitled, "BARBECUE GRILL AND SMOKER WITH BOTTOM MOUNTED FIREBOX," having Ser. No. 60/148,435, filed Aug. 11, 1999, which is entirely incorporated herein by reference.

BACKGROUND OF THE INVENTION

1. Field of the Invention

The present invention generally relates to barbecue and smoker grills and, in particular, to a combination barbecue and smoker grill which preferably incorporates a firebox mounted below the cooking chamber of the grill.

2. Description of the Related Art

Outdoor grills include devices that are designed for either cooking food items by direct heating, generally referred to as barbecue grills, and cooking food items by indirect heating and smoking, generally referred to as smokers. In both types of grills, a cooking chamber typically is provided which is mounted upon a support structure, such as a pedestal or cart assembly. Typically, such a cooking chamber is configured with a lower portion, mounted to the support structure, and a lid, hingedly mounted to the lower portion, that cooperate to form a cooking enclosure. The cooking enclosure is configured for placing various food items therein, such as upon a grill or other cooking surface that is mounted within the lower portion of the cooking chamber.

In a typical barbecue grill, a heat source, such as charcoal briquettes or gas-fed burners, is provided below the cooking surface of the grill for heating the cooking enclosure and any food items placed therein to a sufficient temperature for cooking the various food items.

In a typical smoker grill, a firebox is provided for maintaining a fire for smoldering wood therein. The firebox is arranged to communicate with the cooking enclosure, with the firebox typically being mounted to a side wall of the cooking chamber. So configured, the smoke and heat produced within the firebox enter the cooking enclosure for smoking food items placed in the cooking chamber. Since the heat from the firebox is not provided directly beneath the food items, however, these grills typically have been unable to cook food items in the same manner as one may accomplish with the use of a barbecue grill which provides for direct heating of the food items.

Therefore, there is a need for providing improved grills which address these and other shortcomings of the prior art.

BRIEF SUMMARY OF THE INVENTION

Briefly stated, the present invention relates to a grill, which preferably is capable of functioning both as a barbecue grill and as a smoker grill. In a preferred embodiment, the grill incorporates a cooking chamber, including a lower portion and a lid that cooperate to define a cooking enclosure. Preferably, the lid is moveably mounted to the lower portion, and the lower portion has a lower surface, which is arranged at least partially beneath the cooking enclosure. Additionally, the lower surface preferably includes an opening formed therethrough. Preferably, a firebox engages the cooking chambers lower surface, whereby there is fluid communication between the cooking chamber and the firebox. The cooking enclosure preferably contains a baffle pan the substantially spans the length and width of the enclosure.

Other objects, features, and advantages of the present invention will become apparent to one with skill in the art upon examination of the following drawings and detailed description. It is intended that all such objects, features, and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

FIG. 1 is a perspective view of a preferred embodiment of the present invention.

FIG. 2 is a perspective view of a preferred embodiment of the present invention showing detail of the baffle pan.

DETAIL DESCRIPTION OF THE PREFERRED EMBODIMENTS

Reference will now be made in detail to the description of the invention as illustrated in the drawings with like reference numerals indicating like parts throughout the several views. As shown in FIG. 1, a preferred embodiment of the grill 10 of the present invention incorporates a cooking chamber 12, which includes a lower portion 14 and a lid 16. Lid 16 typically is hingedly attached to the lower portion and is moveable between a closed position (not shown) and an open position for providing access to a cooking chamber or enclosure 18. Enclosure 18 is sufficiently sized and shaped for the placement of food items for cooking and/or smoking when the lid is in either its open or closed position. Enclosure 18 also includes means defining an opening or passageway 19 formed in the bottom surface thereof.

A firebox 20 preferably is mounted to the chamber 18, such as to a lower surface 22 thereof and includes means defining an opening or port 24, which allows the interior of the firebox 20 to fluidly communicate with the enclosure 18, due to communication between passageway 19 and port 24. So configured, heat and smoke produced within the firebox can be delivered through the port 24 and into the enclosure 18 for cooking and/or smoking food items within the enclosure 18. Firebox 20 also is provided with an access door 26, which provides access to the interior of the firebox 20. Additionally, the access door 26 can be provided with at least one adjustable air baffle or damper 28 for adjusting the flow of air into and through the firebox 20.

As shown in FIG. 2, a baffle pan 30, preferably angled inwardly, (e.g. with a v-shaped cross-section), is provided in a lower portion of the enclosure 18 for distributing heat provided from the firebox 20 throughout the enclosure 18. The baffle pan 30 substantially spans the length and width of the enclosure 18. The baffle pan 30 also serves as a component of a drippings collection system for funneling drippings of the various food products away from the firebox 20. This is accomplished by providing a slight downward slope of the baffle pan 30 away from the firebox 20 toward a dripping collection orifice 32, preferably formed at the other end of the enclosure 18 from the firebox 20. A dripping receptacle 34, such as a can, (not shown) can then be mounted below the collection orifice 32 for receiving the various drippings.

As shown in FIG. 2, a chamber access door 36 preferably is provided which includes at least one or more dampers 38.

The dampers 38 of the chamber access door 36 cooperate with the dampers 28 of the firebox door 20 for adjusting the air flow within and through the firebox 20 and the enclosure 18.

As described hereinbefore, prior art smoker grills typically have been configured with the firebox mounted adjacent the cooking chamber, such as at a side wall of the lower portion of the cooking chamber, so that the smoke and heat produced in the firebox flows into the enclosure through an orifice formed in a side wall of the cooking chamber. This configuration, however, typically does not provide sufficient direct heating of the food items placed within the cooking enclosure for cooking the food items as can be accomplished in a conventional barbecue type grill. In particular, such a configuration typically allows the heat from the firebox to rise to the top of the cooking enclosure after travelling through the orifice of the firebox so that the intense heat from the firebox does not directly contact the food. In contrast, in a barbecue grill, the food items are placed upon a cooking surface, which is oriented directly above a source of heat. Therefore, the intense heat rising from the source of heat is exposed directly to the food products for cooking and browning the food.

By mounting the firebox 20 of the present invention below the cooking chamber, heat is provided directly below the food items placed within the cooking enclosure 18. Thus, the present invention provides for cooking and browning of food items, as has heretofore been accomplished in direct heat cooking grills, as well as smoking of the food items.

Embodiments of the present invention also may be adapted to be utilized as a direct heating grill with or without utilizing the smoker characteristics of the grill. In these embodiments, a charcoal grate (not shown) may be provided, such as above the baffle pan, for holding charcoal briquettes. So configured, the baffle pan functions as an ash collector for receiving ashes from the charcoal briquettes during operation.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A barbecue and smoker grill comprising: a cooking chamber having side walls and a lower surface forming a bottom wall, a lid mounted on an upper portion of said side walls to form a cooking enclosure, a grill for supporting food located at an upper portion of said cooking chamber adjacent said lid and extending across said chamber, said cooking chamber having a length substantially longer than its width and being substantially rectangular in cross section;

a firebox having a door and providing a primary source of smoke and heat for cooking food on the grill, said firebox having a top area extending the width of the cooking chamber and located directly under an end portion of said bottom wall of said cooking chamber and connected to and in heat relationship with said bottom wall, said firebox extending longitudinally of said bottom wall of said cooking chamber, the remainder and comprising a substantial portion of said bottom wall not covering said firebox being free from any source of heat below said cooking chamber; means forming a passageway wherein gases from said firebox may enter an end portion of said cooking chamber through said bottom wall, under said grill, and pass substantially unobstructed along the entire length and width of an inner surface of the bottom wall of said cooking chamber.

2. The barbecue grill of claim 1, Wherein the firebox door includes an adjustable air damper.

3. The barbecue grill of claim 1, wherein the cooking chamber has an access door including a damper.

4. A barbecue and smoker grill comprising: a cooking chamber having side walls and a lower surface forming a bottom wall, a lid mounted on an upper portion of said side walls to form a cooking enclosure, a grill for supporting food located at an upper portion of said cooking chamber adjacent said lid and extending across said chamber, said cooking chamber having a length substantially longer than its width and being substantially rectangular in cross section; a firebox having a door and providing a primary source of smoke and heat for cooking food on the grill, said firebox having a top area extending the width of said cooking chamber and located directly under an end portion of said bottom wall of said cooking chamber and connected to and in heat relationship with said bottom wall, said firebox extending longitudinally of said bottom wall of said cooking chamber, the remainder and comprising a substantial portion of said bottom wall not covering said firebox being free from any source of heat below said cooking chamber; means forming a passageway wherein gases from said firebox may enter an end portion of said cooking chamber through said bottom wall, a baffle positioned above said passageway and extending longitudinally the substantial length of said cooking chamber and spaced from said side walls and bottom wall along its length.

5. The barbecue grill of claim 4, wherein the firebox door includes an adjustable air damper.

6. The barbecue grill of claim 4, wherein the cooking chamber has an access door including a damper.

7. The barbecue grill of claim 4, wherein the baffle is v-shaped or pan shaped in cross section.

8. The barbecue grill of claim 7, wherein the baffle slopes from one end of said cooking chamber to the other to convey drippings to an opening in an end wall of said cooking chamber.

* * * * *